United States Patent [19]
Lallement

[11] Patent Number: 5,176,390
[45] Date of Patent: Jan. 5, 1993

[54] FLEXIBLE PROTECTIVE BELLOWS OPTIONALLY INCLUDING SERRATED ATTACHMENT GROOVE

[75] Inventor: Serge Lallement, La Chapelle Sur Erdre, France

[73] Assignee: Draftex Industries Limited, Edinburgh, Scotland

[21] Appl. No.: 710,062

[22] Filed: Jun. 4, 1991

[30] Foreign Application Priority Data

Jun. 30, 1990 [GB] United Kingdom ................ 9014622

[51] Int. Cl.⁵ ........................... F16J 15/52; F16D 3/84
[52] U.S. Cl. ............................ 277/212 FB; 277/208; 464/175; 403/50; 285/226; 74/18
[58] Field of Search ........................ 277/212 FB, 208; 464/173, 175; 403/50; 285/226, 334.1, 345, 917; 74/18, 18.1, 18.2

[56] References Cited

U.S. PATENT DOCUMENTS

| | | | |
|---|---|---|---|
| 1,880,115 | 9/1932 | Smith et al. | 285/917 X |
| 2,050,137 | 8/1936 | Walsh | 285/917 X |
| 3,559,692 | 2/1971 | Mantelet | 138/121 |
| 3,688,523 | 9/1972 | Schafer | 277/212 FB X |
| 3,807,195 | 4/1974 | Faulbecker | 74/18.1 X |
| 3,830,083 | 8/1974 | Hadick et al. | 277/212 FB X |
| 3,929,165 | 12/1975 | Diebolt et al. | 138/121 |
| 4,079,757 | 3/1978 | Fischer et al. | 138/121 |
| 4,558,869 | 12/1985 | Grove et al. | 277/212 FB X |
| 4,597,745 | 7/1986 | Orian | 277/212 FB X |
| 4,630,834 | 12/1986 | Müller et al. | 277/212 FB |
| 4,702,483 | 10/1987 | Ukai et al. | 277/212 FB |
| 4,730,834 | 3/1988 | Ukai et al. | 277/212 FB |
| 4,747,805 | 5/1988 | Welschof et al. | 277/212 FB X |
| 4,773,458 | 9/1988 | Touzani | 138/121 X |
| 4,786,272 | 11/1988 | Baker | 277/212 FB |
| 4,852,891 | 8/1989 | Sugiura et al. | 277/212 FB X |
| 4,895,550 | 1/1990 | Baker | 277/212 FB X |
| 4,921,147 | 5/1990 | Poirier | 138/121 X |
| 4,923,432 | 5/1990 | Porter | 464/175 |
| 4,927,191 | 5/1990 | Mikol | 138/121 |
| 4,936,811 | 6/1990 | Baker | 277/212 FB X |
| 4,938,726 | 7/1990 | Blano et al. | 277/212 FB X |
| 5,015,215 | 5/1991 | Uchida | 277/212 FB X |
| 5,026,323 | 6/1991 | Fukumura et al. | 277/212 FB X |
| 5,046,745 | 9/1991 | Sweetland et al. | 277/212 FB |

FOREIGN PATENT DOCUMENTS

| | | | |
|---|---|---|---|
| 0963501 | 2/1975 | Canada | 277/212 FB |
| 0249528 | 12/1987 | European Pat. Off. | 464/175 |
| 0327433 | 8/1989 | European Pat. Off. | |
| 0005421 | 12/1985 | PCT Int'l Appl. | 464/175 |
| 1168943 | 10/1969 | United Kingdom | |
| 1218729 | 1/1971 | United Kingdom | |
| 2031530 | 4/1980 | United Kingdom | |
| 2199093 | 6/1988 | United Kingdom | |

*Primary Examiner*—William A. Cuchlinski, Jr.
*Assistant Examiner*—James K. Folker
*Attorney, Agent, or Firm*—Leydig, Voit & Mayer

[57] ABSTRACT

A flexible protective bellows for enclosing a universal joint of a vehicle transmission is designed so that alternate folds are of different shape from the intervening ones. This reduces wear between the peaks of adjacent folds when the bellows is compressed. The troughs are formed with loops to reduce wear when the bellows is stretched. Various means for securing the bellows in its fixing groove in the housing of the universal joint are also disclosed as are means for incorporating a toothed ring for use in speed measurement for the vehicle's ABS system.

17 Claims, 7 Drawing Sheets

5,176,390

FLEXIBLE PROTECTIVE BELLOWS OPTIONALLY INCLUDING SERRATED ATTACHMENT GROOVE

BACKGROUND OF THE INVENTION

The invention relates to a flexible protective bellows, comprising a plurality of integrally connected turns or folds with alternate ones of the turns or folds being of different configuration from that of the intervening ones.

One such form of bellows is shown in GB-A-2 031 530. In this bellows, each bellows turn or fold differs in configuration from the adjacent bellows turn or fold in that it is of a different size thereto, each of the bellows turns or folds being triangular in cross-section. A problem arises with this type of construction in that, when compressed, the straight sides of the adjacent triangular-shaped bellows turns or folds abut with each other and are in contact over relatively large surface areas, and this can cause wear. Another example of such a bellows is shown in GB-A-2 199 093. In this bellows, though, the bellows turns or folds are of greatly varying configuration along the length of the bellows, and the construction is thus complex and is suitable only for specialised applications.

The invention also relates to a flexible protective bellows, comprising a plurality of integrally connected turns or folds with each fold being integrally connected to the next fold and defining a trough between them.

Examples of such bellows are shown in GB-A-2 031 530 and GB-A-2 199 093, referred to above. Another example is shown in U.S. Pat. No. 4,702,483. A problem which arises with such bellows, however, is that excessive wear can occur due to fatigue in the material of the bellows at the troughs between adjacent bellows turns or folds. The invention aims to overcome this problem.

The invention further relates to an arrangement for securing a flexible protective bellows to a member forming at least part of a rotary mechanism to be protected by the bellows, comprising a circumferential groove in the said member for receiving a profile formed in the material of the bellows and adjacent one end thereof.

An example of such an arrangement is shown in GB-A-1 218 729. It is extremely important that the bellows be securely anchored in the groove so as to prevent any relative movement taking place which is particularly likely to occur when the material of the bellows is cold and thus relatively stiff.

BRIEF SUMMARY OF THE INVENTION

According to one aspect of the invention, there is provided a flexible protective bellows, comprising a plurality of integrally connected turns or folds with alternate ones of the turns or folds being of different configuration from that of the intervening ones, the alternate ones of the folds being triangular shaped in cross-section and the intervening ones being curved in cross-section, such as to minimise abrasive contact between adjacent folds.

The differing shapes of adjacent bellows turns or folds reduce the contact between adjacent turns or folds when compression occurs and, in particular, minimise abrasive contact at the peaks of the folds.

According to another aspect of the invention, there is provided a flexible protective bellows, comprising a plurality of integrally connected turns or folds with each fold being integrally connected to the next fold and defining a trough between them, each trough being configured to reduce stretching of the material at the trough when the bellows is longitudinally stretched.

According to a further aspect of the invention, there is provided an arrangement for securing a flexible protective bellows to a member forming at least party of a rotary mechanism to be protected by the bellows, comprising a circumferential groove in the said member for receiving a profile formed in the material of the bellows and adjacent one end thereof, the groove being formed with projections for engaging the material of the profile.

BRIEF DESCRIPTION OF THE DRAWINGS

A flexible protective bellows embodying the invention and made of thermoplastic material and for use in protecting universal joints in motor vehicle transmissions, and arrangements according to the invention for fitting flexible protective bellows in position, will now be described, by way of example only, with reference to the accompanying drawings in which.

DESCRIPTION OF THE PREFERRED EMBODIMENTS

Figure 1:
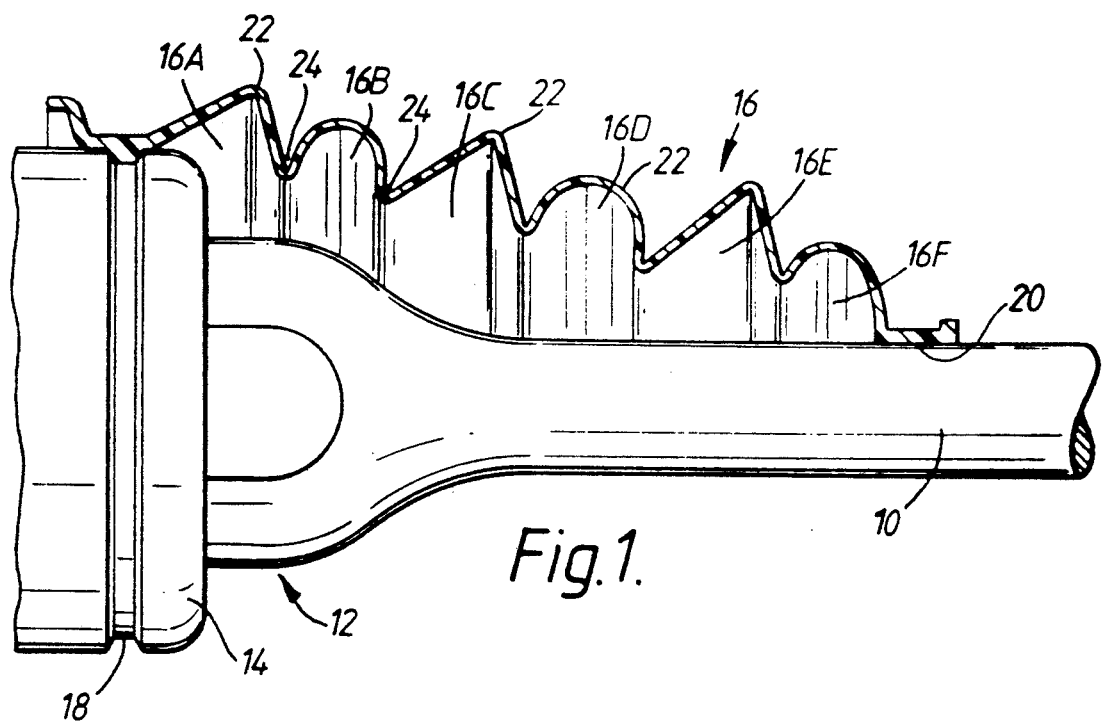
FIG. 1 is a diagrammatic side view showing, in simplified form, a universal joint incorporated in a front wheel drive shaft of a motor vehicle transmission and showing part of one of the bellows.

As shown diagrammatically in FIG. 1, a drive shaft 10 for the front wheel drive transmission of a motor vehicle drives the road wheel through a universal joint indicated generally at 12 and including a housing 14. The universal joint is enclosed within a bellows which is made of thermoplastic material and part, only, of which is shown at 16.

At one end, the bellows is secured (in the manner to be explained) within a groove 18 on the outside of the housing 14. At the other end, the bellows is secured at 20 to the shaft 10.

Figure 2:
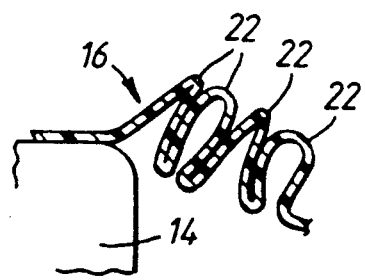
FIG. 2 shows the bellows of FIG. 1 in compressed form.
Figure 3:
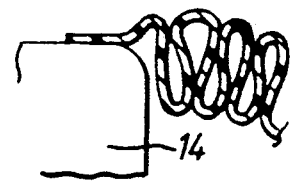
FIG. 3 is a diagrammatic view corresponding to part of FIG. 1 but showing a prior art form of bellows construction in compressed form.

The bellows 16 is moulded from thermoplastic material and is configured to provide a plurality of turns or folds 16A, 16B ... 16F, each of which has a peak (e.g. as shown at 22) and each of which is connected to the adjacent fold by a trough (e.g. at 24). As is clear from FIG. 1, the configuration of the folds 16A to 16F varies. The folds 16A, 16C and 16E have sharply pointed peaks while the intervening folds 16B, 16D and 16F have rounded peaks. The provision of such alternately different configurations for the folds is advantageous in reducing wear when the bellows becomes compressed in operation (during articulation of the joint 12). FIG. 2 shows in diagrammatic form the configuration which the bellows takes when compressed. Because of the configuration of the folds, the compressed folds are still spaced apart in the region of their peaks. This contrasts with what is shown in FIG. 3. FIG. 3 illustrates a previously known type of bellows in which all the folds are of the same type of configuration (generally rounded in this example). When such a bellows is compressed, as shown in FIG. 3, the material of the bellows comes into forceful contact in the area of the peaks of the folds. It is found in practice that this can cause rapid wearing of the material.

Figure 4:
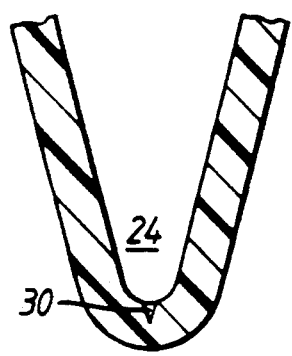
FIG. 4 shows, to an enlarged scale, a sharp bend in the material of the bellows, at the trough between adjacent folds of the bellows, illustrating how wear can develop.
Figure 5:
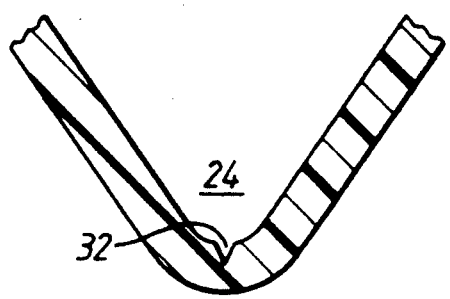
FIG. 5 is similar to FIG. 4 but shows a greater degree of wear.
Figure 6:
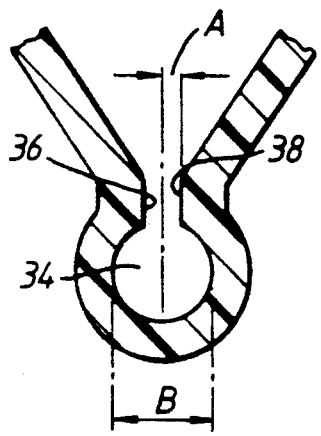
FIG. 6 shows a modification to the bend in the bellows illustrated in FIGS. 4 and 5 for the purposes of reducing wear.
Figure 7:
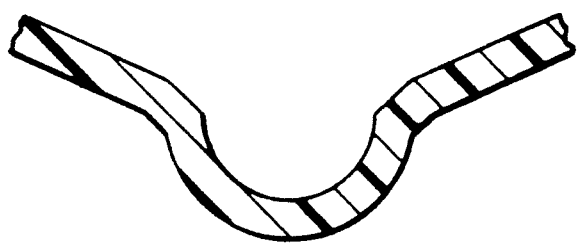
FIGS. 7 and 8 show the bellows construction of FIG. 6 in stretched and compressed configurations.
Figure 8:
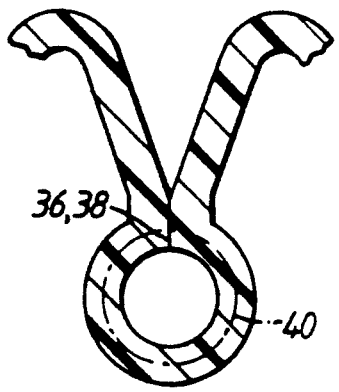
Figure 9:
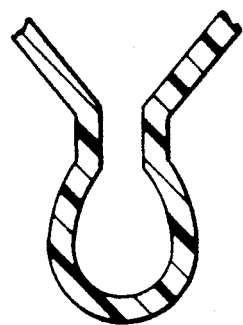
FIGS. 9 to 14 show modified forms of the construction shown in FIG. 6.
Figure 10:
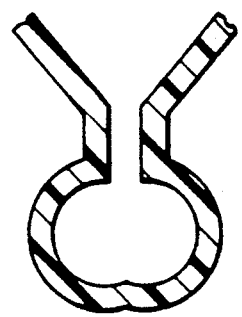
Figure 11:
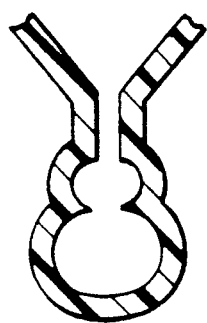
Figure 12:
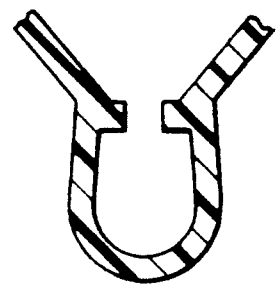
Figure 13:
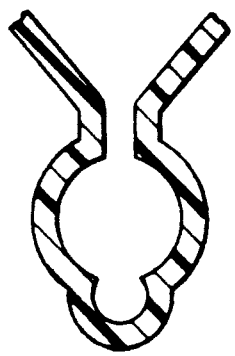
Figure 14:
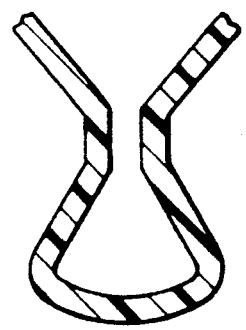

FIG. 4 illustrates one of the troughs 24 of FIG. 1 to an enlarged scale. It is found that excessive wear can occur as shown at 30. This is due to fatigue in the material caused primarily by stretching. FIG. 5 shows how an actual split 32 in the material can occur at this point. In order to deal with this, the troughs of the bellows may be constructed as shown in FIG. 6 where the material is moulded to form a loop 34 at each trough. When the bellows is stretched, as shown in FIG. 7, the loop 34 is expanded but distributes the stretching action so that the risk of fatigue or a tear is minimised. When the bellows is compressed, as shown in FIG. 8, the loop 34 becomes closed with faces 36 and 38 abutting each other. This abutment action limits the amount of stretching of the material forming the loop 34 (as compared with that which would occur with a configuration such as shown in FIG. 4). The thermoplastic material within the loop 34 is hardly strained any more than it is in its relaxed configuration (FIG. 6). In other words, the curved plane 40 (FIG. 8) constituting the neutral plane of bending has nearly the same configuration as in FIG. 6. In order to obtain optimum operation, it is important that the dimension A (FIG. 6) should always be less than the dimension B.

FIGS. 9 to 14 show alternative forms which the loop 34 of FIG. 6 can take.

Figure 15:
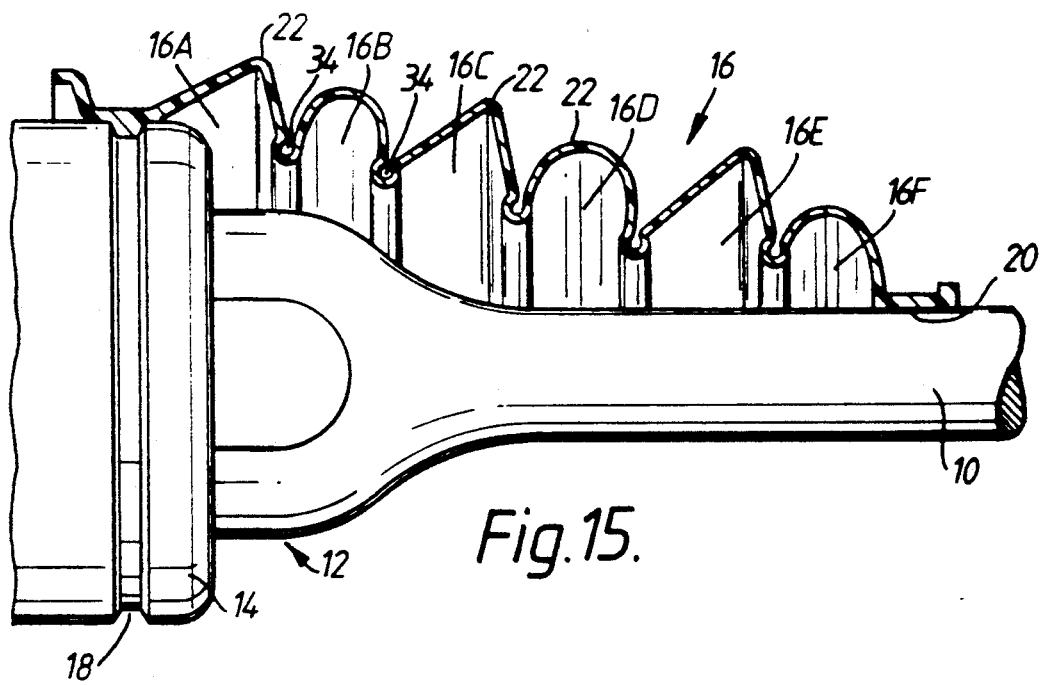
FIG. 15 shows a view corresponding to FIG. 1 but with the bellows modified in accordance with FIG. 6.

FIG. 15 corresponds to FIG. 1 but shows the bellows 16 as incorporating loops 34 in the troughs of the bellows.

Figure 16:
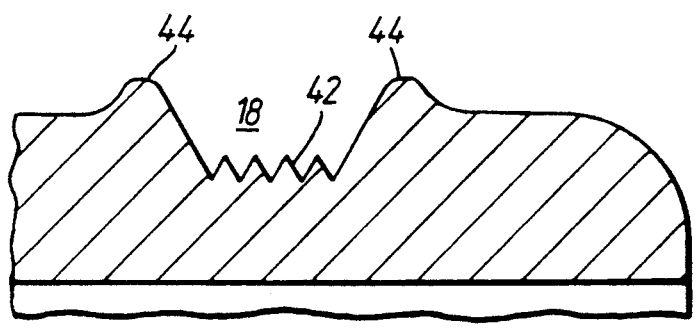
FIG. 16 shows to an enlarged scale and in sectional form a mounting groove for use in securing the bellows on the universal joint.

FIGS. 1 and 15 show the bellows as anchored on the bowl 14 by being fitted within a groove 18. It is important that the bellows is securely anchored in the groove 18, and to the shaft 10, so as to prevent any relative movement taking place. This is particularly likely to occur when the material of the bellows is cold and relatively stiff. FIG. 16 is a cross-section through the housing 14 (FIGS. 1 and 15) but showing a modified form for the groove 18. As shown, the groove is formed with teeth 42 and with raised shoulders 44. The purpose of these configurations, particularly the teeth 42, is to pierce the thermoplastic material of the bellows when it is anchored in the groove 18 so as to avoid any relative movement between the housing 14 and the bellows.

A similar form of groove may be produced on the shaft 10 in the region of the join 20 (FIGS. 1 and 15), for the same purpose: that is, to prevent relative movement in this region between the bellows and the shaft.

Figure 17:
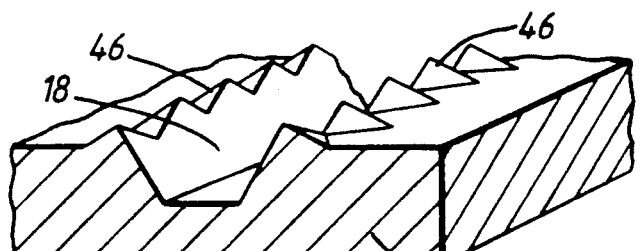
FIGS. 17 and 18 are perspective sectional views corresponding to FIG. 16 but showing modified constructions.
Figure 18:
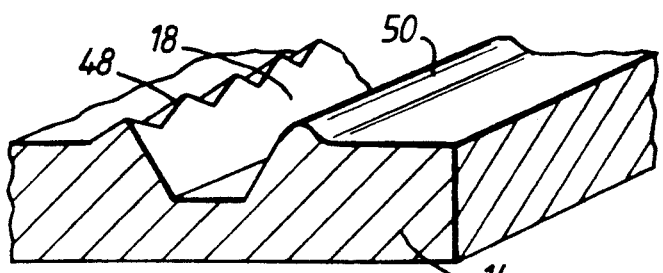

FIG. 17 shows a modified form which the groove can take. Here, teeth 46 are formed along the top of the walls defining the groove. Again, the purpose is the same: that is, to pierce the thermoplastic material of the bellows so as securely to lock it in position. FIG. 18 shows a further possible arrangement in which there are teeth 48 along one side of the groove and a plain shoulder 50 along the other.

Various methods of locking the bellows within the groove 18 will now be described.

Figure 19:
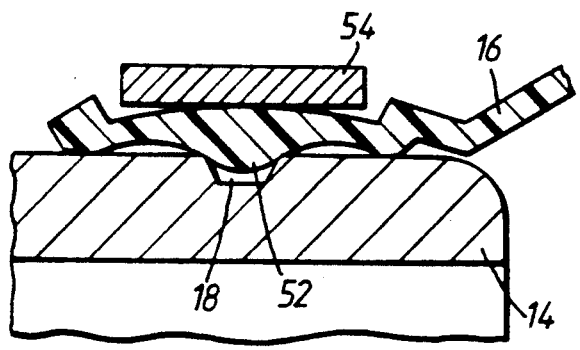
FIG. 19 corresponds in general form to FIG. 16 but shows a modified form of the groove and also shows part of the bellows being clamped in position.

FIG. 19 shows one such form. Here, the configuration of the bellows at the end which is to be fitted to the housing 14 is such as to form a rounded profile 52 (FIG. 20) which extends over a width greater than the width of the throat 18 (FIG. 19). Therefore, the edges along the throat 18 pierce into the thermoplastic material when it is clamped in position on the housing 14 by means of a clamping ring shown diagrammatically at 54. Such an arrangement is found to be advantageous as compared with an arrangement shown diagrammatically in FIG. 21 where the bellows is profiled, at 56, to match the shape of the trough 18; such an arrangement does not give adequate security for the fixing of the bellows to the housing 14.

Figure 20:
FIG. 20 shows the part of the bellows of FIG. 19 in un-clamped configuration.
Figure 21:
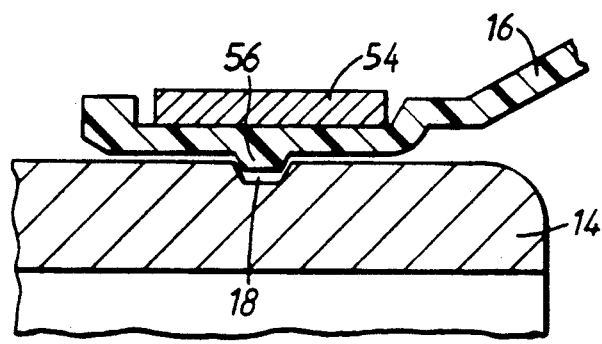
FIG. 21 corresponds to FIG. 19 but shows a prior form of construction.
Figure 22:
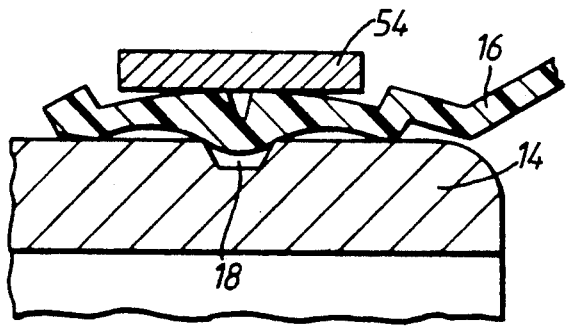
FIGS. 22 and 23 correspond to FIGS. 19 and 20 but show different configurations for the bellows.
Figure 23:
Figure 24:
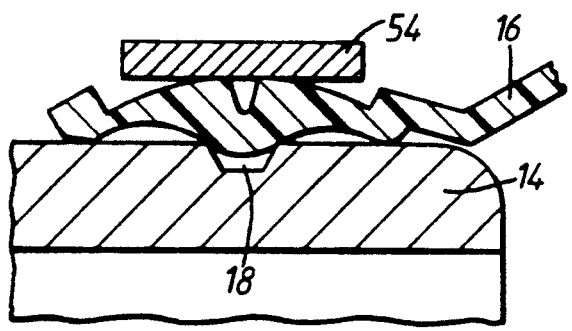
FIGS. 24 and 25 correspond to FIGS. 19 and 20 but show further different configurations for the bellows.
Figure 25:

FIGS. 22 and 23 correspond to FIGS. 19 and 20 respectively and show a modified configuration for the bellows. FIGS. 24 and 25 correspond with FIGS. 19 and 20 and show a further possible modification.

In FIGS. 22 to 25, items corresponding to those in FIGS. 19 and 20 are similarly referenced.

In the arrangement shown in FIGS. 19,22 and 24, the grooves 18 may be constructed as shown in FIGS. 18,19 or 20.

The profiles shown in FIGS. 20,23 and 25 can also be used at the other end of the bellows, where it is fitted onto the shaft 10.

Figure 26:
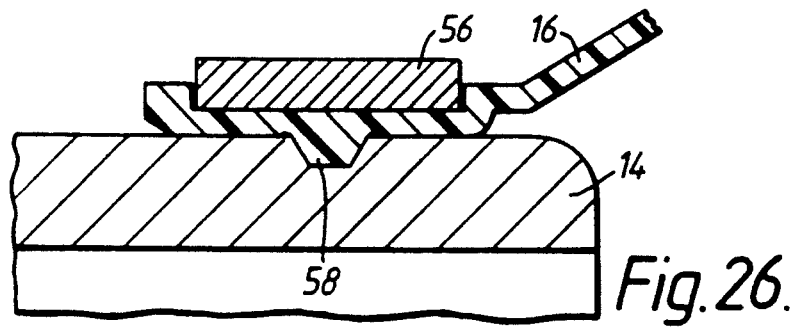
FIGS. 26 and 27 show an alternative means of clamping the bellows in position.

FIG. 26 shows another method of fitting the bellows to the housing 14. Here, special heating jaws 56 are applied to the bellows after it has been placed on the housing 14 and with a profile 58 on the thermoplastic material located in the groove 18. Heating is applied to the thermoplastic material which causes the material to fuse to the material of the housing.

Figure 27:
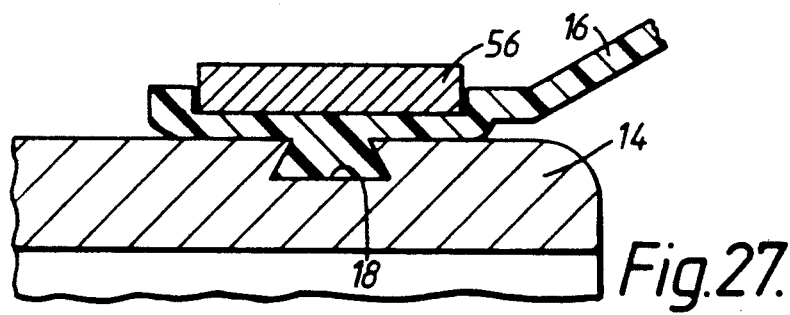

FIG. 27 shows a modified form of arrangement in which the groove 18 has a dovetail-shaped form in cross-section, into which the thermoplastic material fuses when heating is applied by the jaws 56. This gives better security of fixing.

After the heating and fusing operation has taken place, the jaws 56 are removed. The jaws may be in the form of two semi-circular parts defining an inside diameter of appropriate size to embrace the end of the bellows when in position on the housing 14. Clearly, a similar arrangement can be used to attach the other end of the bellows to the shaft.

Figure 28:
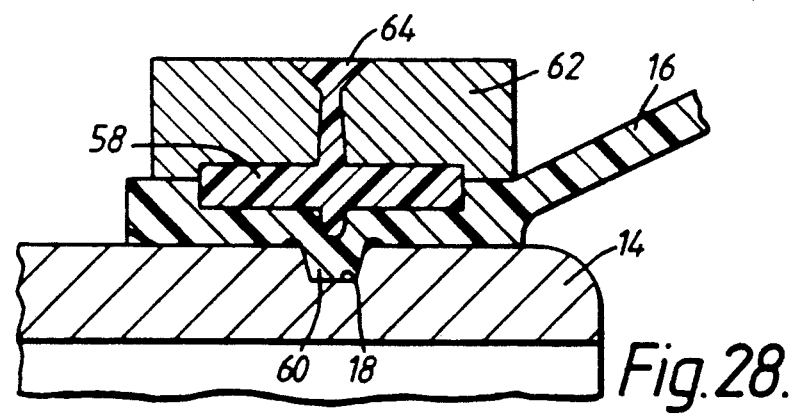
FIG. 28 corresponds to FIG. 19 but shows a method of fixing the bellows in position by an in-situ moulding process.

FIG. 28 shows another possible arrangement for securing the bellows in position on the housing 14. Here, a clamping ring 58, encircling the material of the bellows, is formed in situ by a moulding operation. As shown, the bellows is placed over the housing 14 with a profile 60 engaging in the groove 18. A metal mould 62 is then placed over the outside of the bellows (for example, a two-part mould may be used). By means of an injection moulding process, via an inlet 64, the clamping ring 58 is moulded in position around the complete circumference. The mould is then removed. Such a moulding operation may also be used to attach the other end of the bellows to the shaft.

Figure 29:
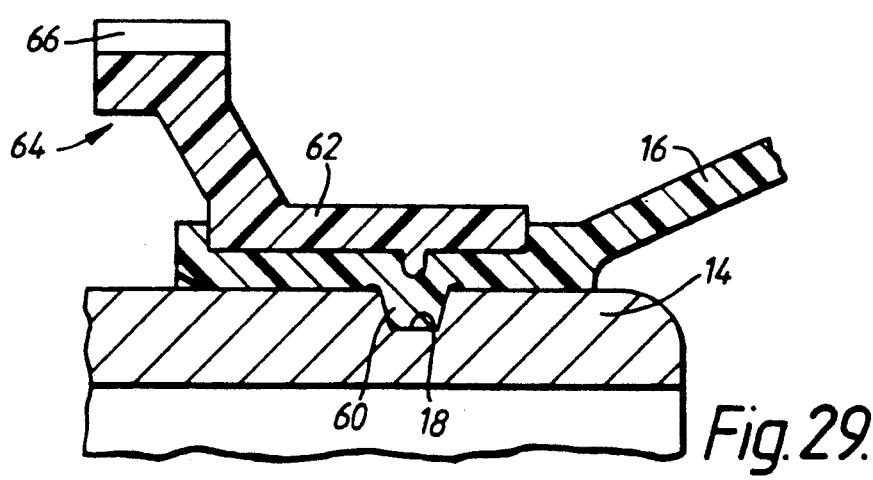
FIG. 29 corresponds to FIG. 28 but shows how a moulded clamping ring for holding the bellows in position may also form a toothed ring for use in controlling the vehicle's ABS system.

Vehicles employing ABS braking systems require a means of detecting the speed of rotation of each road wheel and such means may be in the form of a toothed wheel located adjacent to and rotating with the road wheel and cooperating with a sensor (e.g. optical or magnetic) to measure the speed of rotation. FIG. 29 shows how such a toothed ring may also carry out the function of clamping the bellows on the housing 14. Thus, FIG. 29 shows the bellows on the outside of the housing 14 with a profile 60 located in the groove 18 and held in position by a circumferentially extending extension 62 of a toothed ring 64 for the ABS system. The toothed ring 64 has teeth 66 which interact with an appropriate sensor as the housing 14 rotates with the wheel. Such a toothed ring, including integral extension 62, may be formed in situ by a moulding operation corresponding to that shown in FIG. 28. With the arrangement shown in FIG. 29, an optical-type sensor would normally be used. However, it would be possible to incorporate metal facets into the teeth 66 to permit magnetic sensing.

Figure 30:
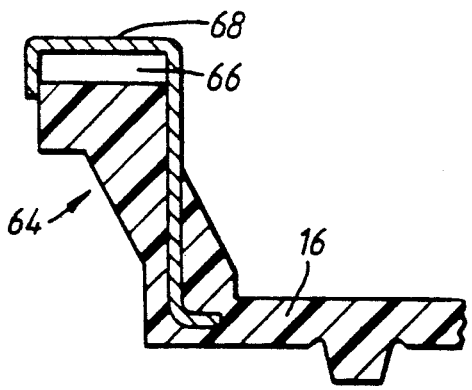
FIG. 30 shows how the toothed ring of the ABS system may be incorporated in the actual bellows construction.
Figure 31:
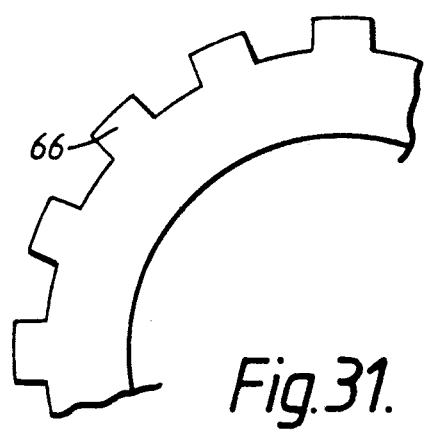
FIG. 31 is a partial end view of the teeth of the ring shown in FIG. 30.

FIG. 30 shows a modified arrangement in which the toothed ring for the ABS system is constituted by the end of the bellows itself. During the moulding operation for producing the bellows, the ABS toothed ring 64 is integrally moulded to produce teeth 66. If the rotation of the toothed ring is to be achieved by use of a magnetic sensor, metal facets such as shown at 68 can be incorporated. FIG. 31 shows the diagrammatic end view of the toothed ring 64.

In the case shown in FIGS. 30 and 31, the bellows would be fixed onto the housing 14 by any of the means already described with its profile 60 engaging the groove 18.

Figure 32:
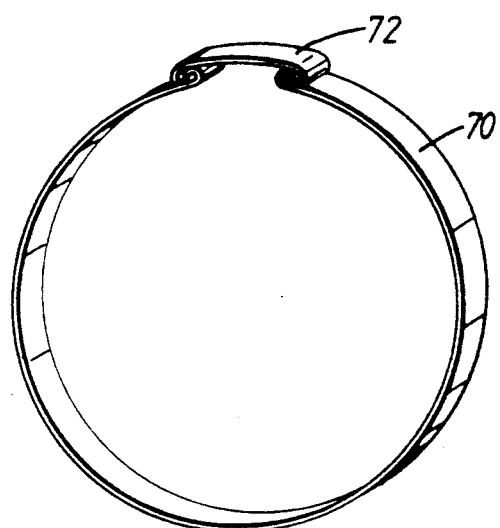
FIG. 32 shows a heat-responsive clamping ring which may be used for clamping the bellows in position.

FIG. 32 shows one form which a clamping ring, such as the clamping ring 54 shown in FIGS. 19,22 and 24, may take. Here, part 70 of the clamping ring is made of ordinary steel. The ring is completed by a hook 72 which is made of metal which contracts in response to the application of heat and remains contracted. Such an arrangement therefore can be designed so as to clamp the end of the bellows firmly in position. Another alternative is to make the entire clamping ring from such heat sensitive material. Reference is made to French Patent Application No. 88.16375 in this respect. An arrangement such as shown in FIG. 32 is advantageous for automatic assembly of bellows onto housings 14. Clearly, similar clamping rings may be used to secure the other end of the bellows onto the shaft.

Figure 33:
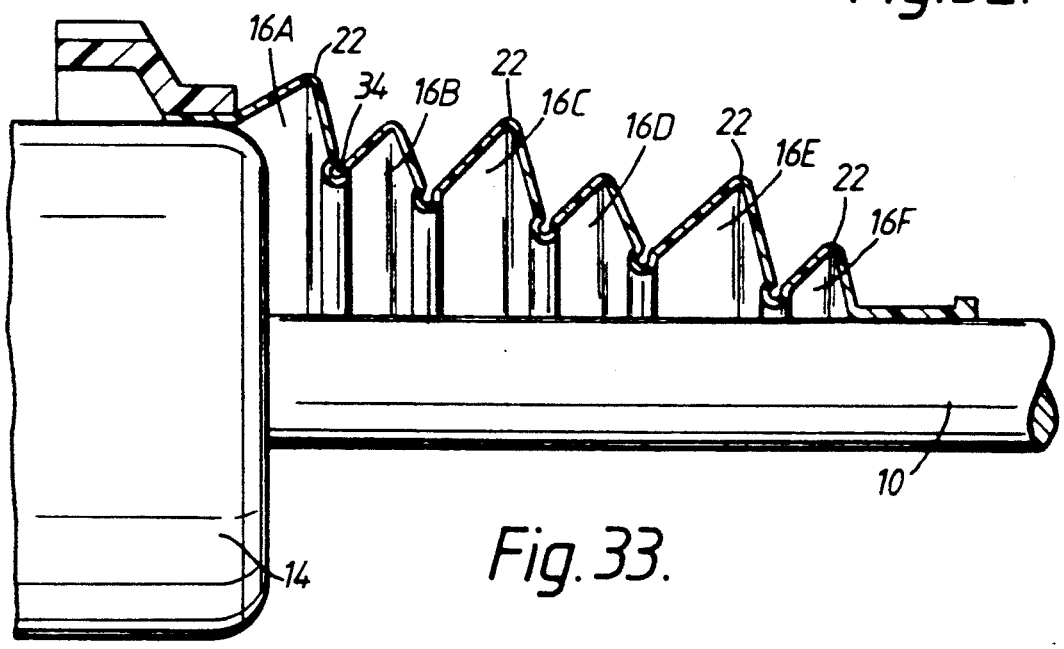
FIG. 33 is a view corresponding to FIG. 1 but showing a modified form of bellows and also incorporating a clamping ring arranged to act as a toothed ring for the ABS system.

FIG. 33 corresponds generally to FIGS. 1 and 15 but shows a modified form of the bellows of FIG. 1 and also incorporating loops 34 of the type shown in FIG. 6 and held in position on the housing 14 by a clamping ring of the type shown in FIG. 29 and incorporating a toothed ring for the ABS system.

What is claimed is:

1. A flexible longitudinally-extending protective bellows, comprising
    first and second longitudinally spaced end portions for making contact with correspondingly spaced parts of a mechanism to be protected by the bellows, and
    a body portion of the bellows which extends integrally between the first and second end portions and is along the whole of its length out of contact with the mechanism,
    the body portion comprising a plurality of integrally connected turns or folds, some of the turns or folds being of a first type having a first configuration and the remainder of the turns or folds being of a second type and having a second configuration which is a different configuration from the first configuration, the turns or folds of the first type alternating along the longitudinally extent of the body portion with the turns or folds of the second type,
    each of the first type of turns or folds being triangular shaped in cross-section, each triangular shape having a triangle-base and a triangle-peak and each triangle-base being positioned more inwardly with respect to the bellows than the corresponding triangle-peak, and
    each of the second type of turns or folds being convexly curved in cross-section with the convex-shape thereof facing outwardly of the bellows,
    such as to minimise abrasive contact between adjacent turns or folds when the body portion undergoes compression,
    the longitudinal separation along the body portion between each turn or fold of the first type and the next one of that type being substantially equal and the longitudinal separation along the body portion between each turn or fold of the second type and the next one of that type being substantially equal.

2. A bellows according to claim 1, in which each pair of adjacent turns or folds defines a trough between and interconnecting them, the troughs between adjacent turns or folds being shaped to reduce wear in the event of longitudinal stretching of the bellows.

3. A bellows according to claim 2, in which at each trough the two turns or folds meeting there are joined together by an integrally connecting loop extending inwardly of the bellows, the loop partially defining the trough.

4. A bellows according to claim 3, in which each said loop is re-entrantly shaped with a re-entrant mouth defined by parallel sides.

5. A bellows according to claim 4, in which the parallel sides defining the mouth of each loop are constituted by relatively flat faces which abut on compression of the bellows.

6. A bellows according to claim 4, in which the width across each loop is greater than half the width across the re-entrant mouth.

7. A bellows according to claim 1, in combination with a mechanism rotatable about an axis parallel to the longitudinal extent of the bellows, the bellows being connected to and at least partially enveloping the mechanism and rotating therewith, the bellows including a circumferentially extending ring formed with discrete teeth for use in measuring the speed of rotation of the mechanism.

8. A bellows according to claim 7, in which the discrete teeth incorporate metal inserts.

9. A bellows according to claim 1, having a clamping ring which is moulded in situ in position around the circumference of an end region of the bellows for securing it in position.

10. A bellows according to claim 1, in combination with the said mechanism, in which the mechanism includes a member rotatable about an axis and to which member one said end portion is secured, the end portion defining a circumferential profile, the member defining a circumferential groove for receiving the said profile, the groove having a base arranged circumferentially around the member and extending between two sides walls of the groove which extend radially outwardly of the member from the said axis, the base of the groove being formed with a plurality of separate projections each extending circumferentially around the said member and projecting radially outwardly thereof from the said axis for engaging the material of the profile.

11. An arrangement for securing a protective bellows made of flexible material to a member forming at least part of a mechanism which is to be protected by the bellows and which is rotatable about an axis, comprising a circumferential groove in the said member for receiving a profile formed in the material of the bellows and adjacent one end of the bellows, the groove having a base arranged circumferentially around the member and extending between two side walls of the groove which extend radially outwardly of the member from the said axis and terminate in circumferentially extending distal edges which together define a mouth for the groove;

at least one of the distal edges being formed with a plurality of separate teeth which are arranged next to each other in the circumferential direction and engage the material of the bellows adjacent the said profile.

12. An arrangement according to claim 11, in which the profile has a convexly curved surface facing radially inwardly towards the said axis for engaging the said teeth.

13. An arrangement according to claim 11, in which the said teeth extend along both distal edges forming the mouth of the groove.

14. An arrangement according to claim 11, in which the said teeth extend along only one of the distal edges and in which the other edge has a single profile extending circumferentially around the member.

15. A flexible longitudinally extending protective bellows, for connection to and at least partially enveloping a mechanism which is to be protected and which is rotatable about an axis parallel to the longitudinal extent of the bellows, comprising first and second longitudinally spaced end portions for making contact with correspondingly spaced parts of the mechanism, and a body portion of the bellows which extends integrally between the first and second end portions and is along the whole of its length out of contact with the mechanism, the body portion comprising a plurality of integrally connected turns or folds, some of the turns or folds being of a first type having a first configuration and the remainder of the turns or folds being of a second type and having a second configuration which is a different configuration from the first configuration, the turns or folds of the first type alternating along the longitudinally extent of the body portion with the turns or folds of the second type, each of the first type of turns or folds being triangular shaped in cross-section, each triangular shape having a triangle-base and a triangle-peak and each triangle-base being positioned more inwardly with respect to the bellows than the corresponding triangle-peak, and each of the second type of turns or folds being convexly curved in cross-section with the convex-shape thereof facing outwardly of the bellows, such as to minimise abrasive contact between adjacent turns or folds when the body portion undergoes compression, the longitudinal separation along the body portion between each turn or fold of the first type and the next one of that type being substantially equal and the longitudinal separation along the body portion between each turn or fold of the second type and the next one of that type being substantially equal, and a ring extending circumferentially with respect to the axis of rotation of the mechanism and connected to the bellows, the ring being formed with discrete circumferentially extending teeth incorporating metal inserts for use in measuring the speed of rotation of the mechanism.

16. A flexible longitudinally-extending protective bellows, comprising a plurality of integrally connected turns or folds, some of the turns or folds being of a first type having a first configuration and the remainder of the turns or folds being of a second type and having a second configuration which is a different configuration from the first configuration, the turns or folds of the first type alternating along the longitudinal extent of the bellows with the turns or folds of the second type, each of the first type of turns or folds being triangular shaped in cross-section, each triangular shape having a triangle-base and a triangle-peak and each triangle-base being positioned more inwardly with respect to the bellows than the corresponding triangle-peak, and each of the second type of turns or folds being convexly curved in cross-section with the convex shape thereof facing outwardly of the bellows, such as to minimise abrasive contact between adjacent turns or folds.

the first type of turns or folds and the second type of turns or folds being respectively substantially regularly spaced along the longitudinal extent of the bellows.

each pair of adjacent turns or folds defining a trough between and interconnecting them. the troughs between adjacent turns or folds being shaped to reduce wear in the event of longitudinal stretching of the bellows.

at each trough the two turns or folds meeting there being joined together by an integrally connecting loop extending inwardly of the bellows, the loop partially defining the trough, each said loop being re-entrantly shaped with a re-entrant mouth defined by parallel sides.

17. A bellows according to claim 16, in which the parallel sides defining the mouth of each loop are constituted by relatively flat faces which abut on compression of the bellows.

* * * * *